US006978272B1

(12) United States Patent
Ellmann et al.

(10) Patent No.: US 6,978,272 B1
(45) Date of Patent: Dec. 20, 2005

(54) METHOD AND APPARATUS FOR DISPLAYING INSTRUMENTATION PARAMETERS IN A DATABASE SYSTEM

(75) Inventors: Curtis J. Ellmann, Madison, WI (US); Jie-Bing Yu, Carlsbad, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/450,463

(22) Filed: Nov. 29, 1999

(51) Int. Cl.[7] ............................................. G06F 17/30
(52) U.S. Cl. ........................... 707/102; 707/3; 700/29; 700/108; 702/123
(58) Field of Search .......................... 707/2, 3, 202, 707/4, 101, 102, 203; 714/38; 717/4; 700/29; 700/108; 702/123

(56) References Cited

U.S. PATENT DOCUMENTS

| | | | | |
|---|---|---|---|---|
| 5,412,806 A | * | 5/1995 | Du et al. ........................ 707/2 |
| 5,469,361 A | * | 11/1995 | Moyne ........................ 700/95 |
| 5,642,505 A | * | 6/1997 | Fushimi ...................... 707/101 |
| 5,737,536 A | * | 4/1998 | Herrmann et al. .......... 709/217 |
| 5,794,256 A | * | 8/1998 | Bennett et al. ............. 707/100 |
| 5,812,840 A | * | 9/1998 | Shwartz ......................... 707/4 |
| 5,873,093 A | * | 2/1999 | Williamson et al. ..... 707/103 R |
| 5,954,829 A | * | 9/1999 | McLain et al. ............. 714/712 |
| 5,983,364 A | * | 11/1999 | Bortcosh et al. ............. 714/25 |
| 6,035,298 A | * | 3/2000 | McKearney ................. 707/10 |
| 6,145,121 A | * | 11/2000 | Levy et al. .................... 703/22 |
| 6,167,448 A | * | 12/2000 | Hemphill et al. ........... 709/224 |
| 6,243,615 B1 | * | 6/2001 | Neway et al. ............... 700/108 |
| 6,253,203 B1 | * | 6/2001 | O'Flaherty et al. ............ 707/9 |
| 6,275,824 B1 | * | 8/2001 | O'Flaherty et al. ............ 707/9 |
| 6,279,125 B1 | * | 8/2001 | Klein .......................... 714/38 |
| 6,286,131 B1 | * | 9/2001 | Beers et al. ................ 717/125 |
| 6,343,320 B1 | * | 1/2002 | Fairchild et al. ............ 709/224 |
| 6,453,468 B1 | * | 9/2002 | D'Souza ...................... 717/168 |
| 6,516,320 B1 | * | 2/2003 | Odom et al. ................ 707/101 |
| 6,584,430 B1 | * | 6/2003 | Rosenbaum et al. ........ 702/183 |
| 2003/0115212 A1 | * | 6/2003 | Hornibrook et al. ..... 707/103 R |
| 2003/0200462 A1 | * | 10/2003 | Munson ...................... 713/200 |

FOREIGN PATENT DOCUMENTS

GB          0 838 757       * 4/1998       ............. G06F 9/46

* cited by examiner

*Primary Examiner*—Leslie Wong
(74) *Attorney, Agent, or Firm*—Gregory A. Welte

(57) ABSTRACT

An instrumentation system for a database. A database management system contains instrumentation code which monitors behavior of the system, and stores parameters indicative of the behavior. Those stored parameters are copied into a second database, which is organized according to the same schema as the database itself. Both databases are searchable using the same query language, so that a system administrator can locate (1) data within the database and (2) diagnostic information about the system using a single search tool.

13 Claims, 8 Drawing Sheets

FIG. 2

| NAME SURNAME | NAME GIVEN | STREET NUMBER | STREET NAME | CITY | STATE | ZIP | TELEPHONE AREA CODE | TELEPHONE NUMBER |
|---|---|---|---|---|---|---|---|---|
| ADAMS | JACK | 6363 | OAK | DAYTON | OH | 45454 | 937 | 445 – 6262 |
| BAKER | STAN | 41 | CHERRY | DAYTON | OH | 45456 | 937 | 445 – 6333 |
| DEXTER | PHIL | 477 | DRAKE | DAYTON | OH | 45444 | 937 | 445 – 6223 |

FIG. 4

REM COMPUTE PINCOUNT  ← 50

( LINES OF CODE WHICH COMPUTE PINCOUNT ) ← 55

REM VARIABLE "PINCOUNT" REPRESENTS PINCOUNT ← 60

STORE PINCOUNT, 100,001 ← 65

FIG. 5

REAL: PINCOUNT ← 70

REM COMPUTE PINCOUNT ( LINES OF CODE WHICH COMPUTE PINCOUNT, AND ASSIGN VALUE TO "PINCOUNT" ) ← 75

REM VARIABLE "PINCOUNT" REPRESENTS PINCOUNT

REM WAIT FOR USER INPUT CALLING FOR PINCOUNT

PRINT "PINCOUNT IS", PINCOUNT ← 80

METHOD AND APPARATUS FOR DISPLAYING INSTRUMENTATION PARAMETERS IN A DATABASE SYSTEM

The invention concerns displaying, to a user, behavioral parameters of a database system which have been measured by instrumentation code which periodically examines the system.

BACKGROUND OF THE INVENTION

Many types of database management software contain instrumentation code which examines various parameters, or values, within the system, and stores the parameters for examination and use by system administrators. However, the accessibility of these parameters is not always optimal, from the administrators' perspectives.

OBJECTS OF THE INVENTION

An object of the invention is to provide an improved database management system.

SUMMARY OF THE INVENTION

In one form of the invention, the instrumentation parameters are organized into their own database. The schema of this database is similar, or identical, to that of the underlying database. Consequently, the same query language can be used to query both the parameter-database and the underlying database.

In another form of the invention, the database containing the instrumentation parameters is virtual; no permanent tables exist. The tables of this database are created as needed.

BRIEF DESCRIPTION OF THE DRAWINGS

FIG. 2 illustrates a simple database, namely, part of a telephone directory.

FIGS. 4 and 5 illustrate source code in a hypothetical language which store instrumentation parameters.

DETAILED DESCRIPTION OF THE INVENTION

This discussion will first explain one context within which the invention operates.

Databases Generally

Figure 1:
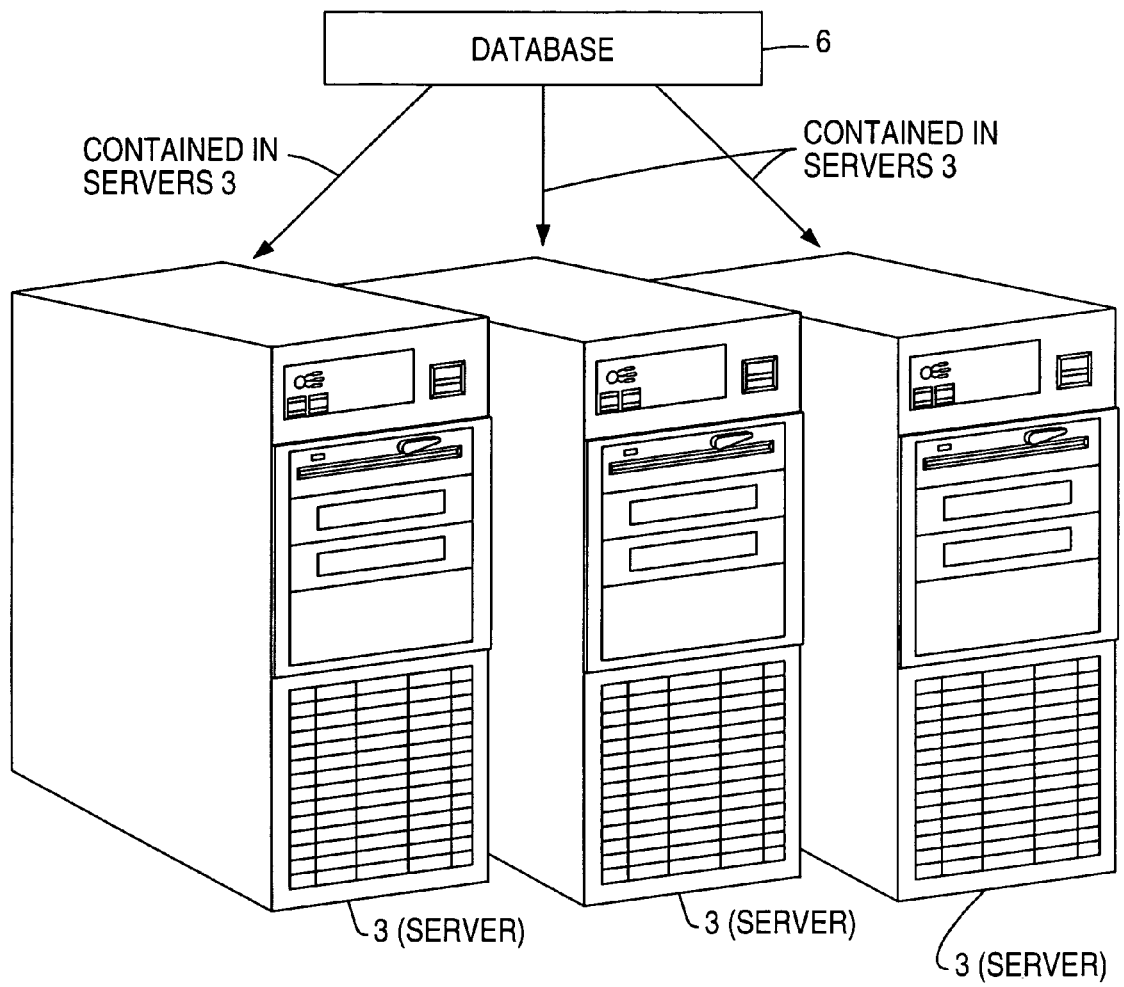
FIG. 1 illustrates a generic database system.

FIG. 1 illustrates a system of servers 3 containing a database 6. Databases generally can be extremely large and complex. A very simple database, namely, a telephone directory, will be considered. FIG. 2 illustrates part of a telephone directory. This database is arranged in rows 12, termed "records," and columns 13, termed "fields."

In a database, a user submits "queries," which specify (1) one or more columns, and (2) for each column, a character sequence to be located. The queries are submitted to a database management system, which then searches the database itself. The management system identifies the records containing columns which contain the specified sequences.

For example, a query may request identification of all records containing the word "Dayton" in the "city" field. In response to this query, the system would identify all three records shown, together with perhaps others having "Dayton" in the "city" field.

A more complex query may request identification of all records containing (1) the word "Dayton" in the "city" field, and also (2) the word "Adams." in the "surname" field. In response to this query, the system would identify the first record, or the "Jack Adams" record.

This particular query is conjunctive, in the sense that only the records satisfying both conditions (1) and (2) were retrieved. The query could be re-phrased, and may request identification of any record which contains either (1) the word "Dayton" in the "city" field, or (2) the word "Adams" in the "surname" field. This query is disjunctive, and a larger number of records would be found in response to this query.

A yet more complex query may repeat the preceding conjunctive query, but with the additional stipulation that no records be identified containing the word "oak" in the "street name" field. In response to this query, the system would identify no records.

In the general case, a query specifies a combination of one or more fields, and, for each field, states a character string. Each field and its character string can be viewed as a variable in a Boolean expression. The variables are combined using Boolean operators, such as AND, OR, NOT, and so on. In response to the query, the system locates the particular combination of records which satisfy the Boolean expression.

For example, the last query discussed above may be framed in Boolean terms as:

(CITY:DAYTON) AND (SURNAME:ADAMS) AND NOT (STREET NAME: OAK).

No record in the database satisfies this query (assuming, of course, that the records are presented in alphabetical order, so that the only "Adams" is the one shown).

In more complex queries, Boolean combinations of the character strings can be specified, as when a query states that either the name "Dayton" or "Chicago" can occur in the "city" field.

Instrumentation Code

In some database systems, the database management software includes instrumentation code which examines the software and hardware, in order to evaluate the health of the system, and also to provide useful information to system administrators. For example, each server in FIG. 1 may be given an identification number. The instrumentation code may examine the software running on each server, and ascertain essential information about the software, such as the instance number of that software, the version number, the date of issue, the serial number, and so on. The instrumentation code reports this information.

As another example of data sought by the instrumentation code, databases sometimes contain "pinned" records. To explain pinned records, a brief background of database structure must be given. As an example, the New York City telephone directory, used by directory assistance operators, may be stored in a large computer disc drive. Assume that a telephone subscriber calls one of the operators, and asks for the telephone number of "Jake Wilson." One approach to locating the record for Jake Wilson would be to start at the beginning of the physical disc drive, and search, name-by-name, for "Jake Wilson." However, this approach, while effective, would be time-consuming.

In another approach, an index may be provided. That is, a second, smaller, database is provided. That database may contain 26 records, each assigned a letter of the alphabet. Each record indicates where, in the disc drive, the names beginning with its assigned letter are located. In looking for Jake Wilson, the system would examine the index record for names beginning with the letter "W." That record will state the physical address, in terms of cylinder-and-sector, where the first Wilson-record resides on the disc drive.

The first Wilson-record contains, in addition to the information indicated in FIG. 1, another address, which states the physical address, in terms of cylinder-and-sector, of the next Wilson-record. This physical address is termed a "pointer." The next Wilson-record contains a similar pointer, as does the third, and so on.

Now "pinning" can be explained. A record which contains a pointer which must not be lost, or discarded, is said to be "pinned." That record cannot be deleted, or at least cannot be deleted without taking measures to prevent loss of the pointer. In this example, all the "W-records," except the last, are pinned. The last is not pinned because it contains no pointer: no "W-records" follow it.

The instrumentation code under consideration maintains either (1) a list of the pinned records, or (2) a number indicating the total number of records currently pinned, or (3) other data needed about the pinned records.

As a third example of data maintained by the instrumentation code, the code maintains data indicative of the status of buffers in the system. Buffers are memory locations where data is temporarily stored, while en route to, or from, the storage locations where the data is permanently stored. This information may include an indicator of whether the buffer is "dirty." A buffer is "dirty" if it (1) has been written to, thereby changing the data, but (2) has not been flushed in order to make it consistent with other copies of data within the system.

The preceding three examples are illustrative only. Numerous other types of data are created and maintained by the instrumentation code.

Feature of the Instrumentation Code

An important feature of the data which is derived and maintained by the instrumentation code is that the data contains operating parameters of the database system. In general, these parameters are different from, and independent of, the information within the database, although the parameters can be influenced by the database information.

For example, some instrumentation parameters are numerical. It can be expected that some of them will change if the size of the database changes. However, this change is not based on the informational content of the database, but rather on the size of the database.

As another example, for a given database, such as a telephone directory, the instrumentation code may produce a certain set of parameters. This set may be termed a "vector." For another database, such as an inventory control system, it is possible, though not likely, that the instrumentation code may produce the same vector. However, the two databases are clearly different in content. The similarity of the vectors is based on a similarity in behavior of the two database systems, and not on content of the databases. The similarity is coincidental.

How the Instrumentation Code Stores the Data

Figure 3:
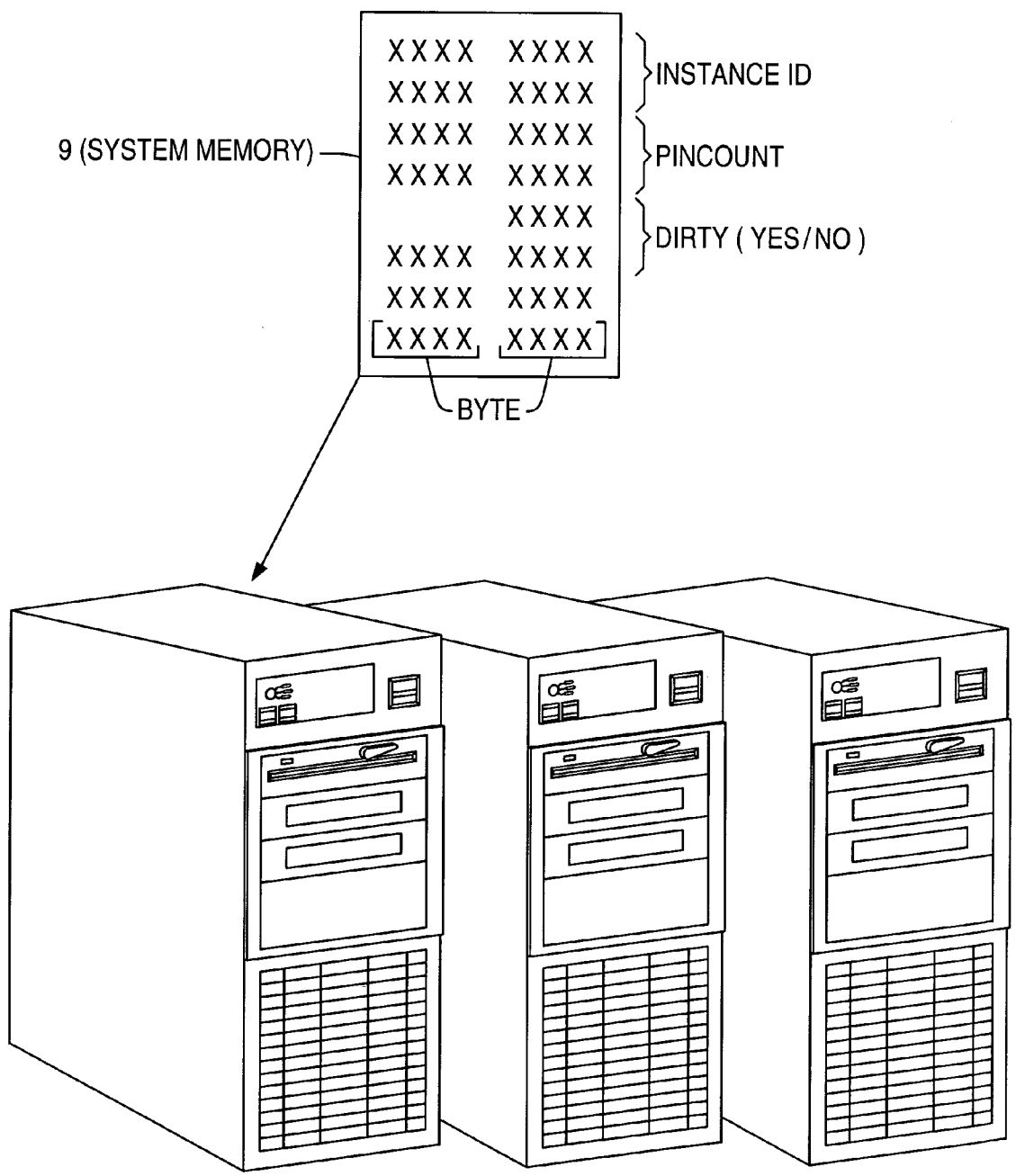
FIG. 3 illustrates storage of instrumentation parameters at locations within system memory 9.

As stated above, the instrumentation code monitors selected system parameters. The code stores those parameters. To understand how the invention operates, one must first look at how the code stores the parameters, without benefit of the invention. The particular manner of storage is determined by the author of the instrumentation code. In one approach, the parameters may be stored within system memory 9, as indicated in FIG. 3. In that Figure, the "Instance ID" (that is, the instance of the management software currently running) is allocated two bytes, indicated by the X's. The "Pincount" (indicating the number of pinned records) is allocated two bytes, and, for simplicity, the "Dirty" flag is allocated a full byte, although a single bit would probably suffice.

As an example of simple instrumentation code, FIG. 4 illustrates "generic" source code. Line 50 is a non-compiled "reminder" line indicating that the parameter "Pincount" is about to be computed. Lines 55 indicate that the computation occurs. Line 60 is another reminder line, and identifies the variable name given to the parameter "Pincount." Line 65 indicates that the value of "Pincount" is stored at memory location 100,001, decimal. The author of the code chose to store the parameter at a specific memory location, which is stated in the source code.

Eventually, these instrumentation parameters, or a subset of them, are to be displayed to a system administrator. But the details of how the parameters are displayed are, again, controlled by the author of the instrumentation code. For example, (1) the timing of the display operation, (2) the choice of which parameters are to be displayed at each time, and (3) numerous other factors are determined by the author of the instrumentation code.

Another approach is possible. It is not necessary to store the parameters at specific locations in memory. In FIG. 5, line 70 declares that the variable "Pincount" is of the "real" type. Lines 75 compute the value of "Pincount," and assign that value to the variable of the same name. Now, when the parameter is to be displayed, as in line 80, the instrumentation code does not read a specific memory location, as in the previous case. Instead, it deals with a variable name: "Pincount."

Under this approach, the agency which handles the details of storing and tracking parameters at specific addresses is the compiler used to compile the source code. The author of the instrumentation code is concerned only with the variable names, not the storage locations.

Figure 6:
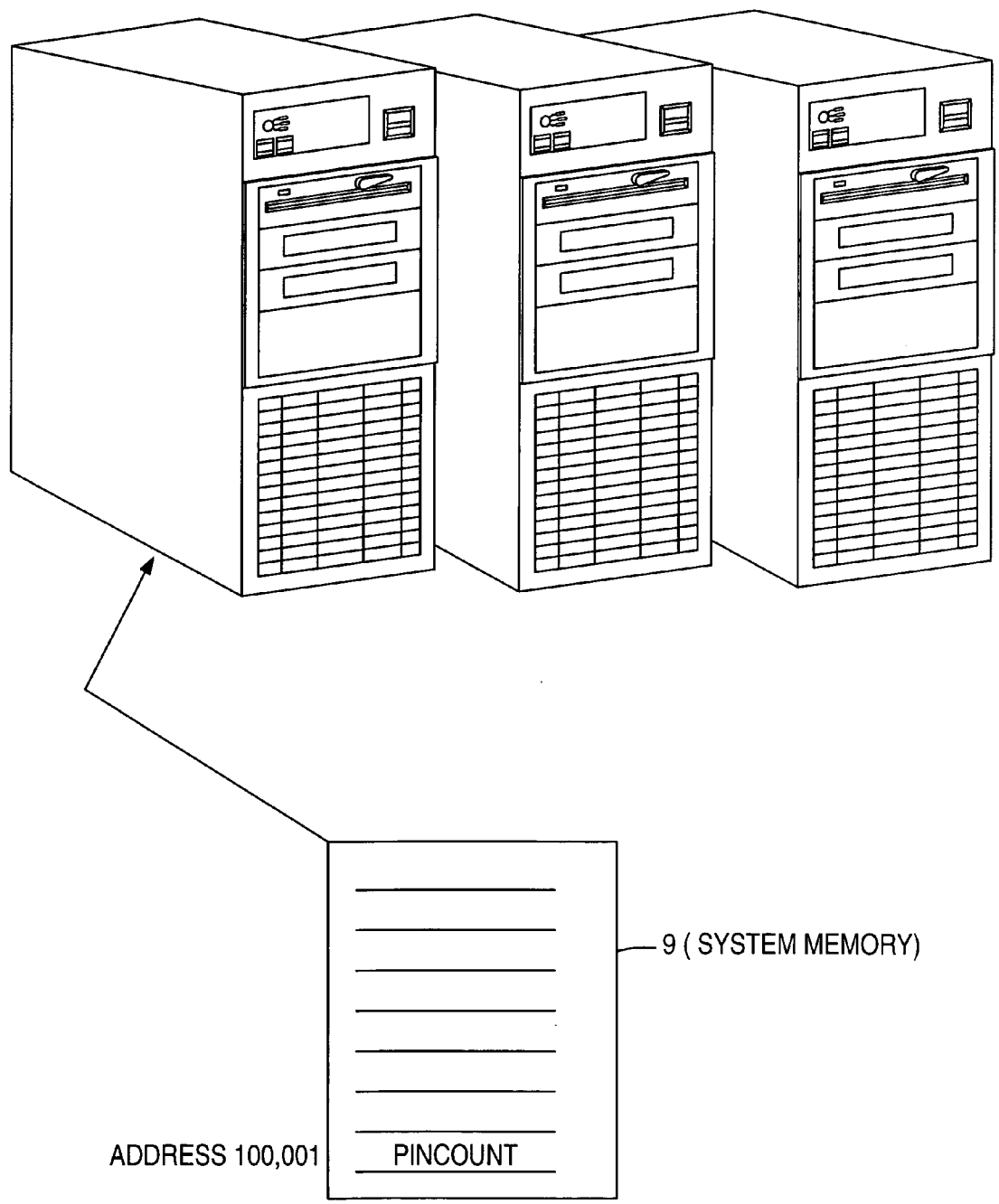
FIG. 6 illustrates storage of a specific parameter at a specific location within system memory 9.
Figure 7:
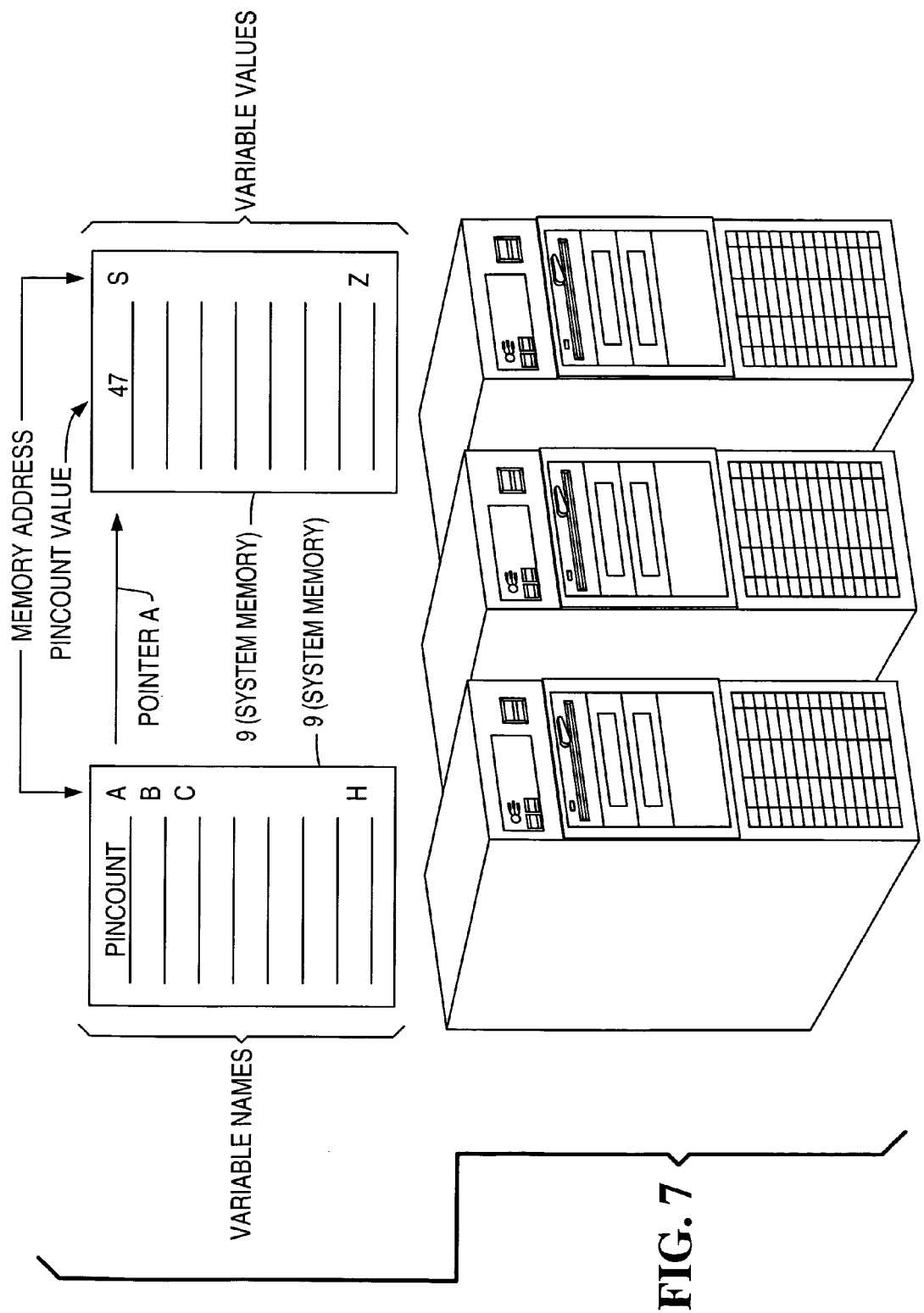
FIG. 7 illustrates how data assigned to the variable "PINCOUNT" may be stored within memory.

FIGS. 6 and 7 recapitulate significant features of the preceding two examples. In FIG. 6, the value of "Pincount" is stored at memory location 100,001, corresponding to FIG. 4. In FIG. 7, corresponding to FIG. 5, the name of parameter "Pincount," together with its value, are stored in a particular manner. In this example, the parameter names are stored at memory addresses ranging from A to H. Their corresponding values are stored at memory addresses ranging from S to Z. A pointer, either explicit or implicit, indicated by arrow A, links the parameter names with the values.

As stated above, the choices of (1) which parameters are displayed and (2) when the display occurs depend on how the instrumentation code was written. In general, a person seeking access to the parameters does not re-write the instrumentation code to change the manner or time of the display operation, if a different type of display would be more convenient. Further, while the instrumentation parameters may be stored within the system, they are probably not available "on demand."

The Invention

The invention stores the instrumentation parameters in their own separate database. The schema of the database is the same as that of the underlying database. For example, if the underlying database accepts the SQL query language, then the parameters are stored in a database which also accepts those SQL queries.

In this manner, a system administrator, or any party granted access to the parameter database, can search it, to obtain the results of the instrumentation code's examination of the system.

In one embodiment, the instrumentation parameter database is structurally different from the underlying database. The underlying database is stored in permanent storage, such as an array of disc drives. When it is to be used, subsets of the database are loaded into system memory, as "virtual tables." Thus, in the underlying database, two versions of a given table exist: one version in permanent storage, and one version, the virtual table, in system memory.

Of course, if the virtual table is changed, it no longer fully corresponds to the table in permanent storage, and reconciliation steps, known in the art, are taken to (1) prevent the lack of correspondence from causing problems and (2) remove the lack of correspondence.

In contrast, the instrumentation parameters are not stored in permanent storage. They exist only in system memory, as virtual tables. Thus, if a power outage occurs, the instrumentation parameters will be lost.

Restated, the operational parameters, such as Pincount, are stored as program variables. But they are made available as though they were stored in tables. However, no tables of these parameters are stored in permanent storage. The tables are "virtual": they are materialized, or created, on demand.

Figure 8:
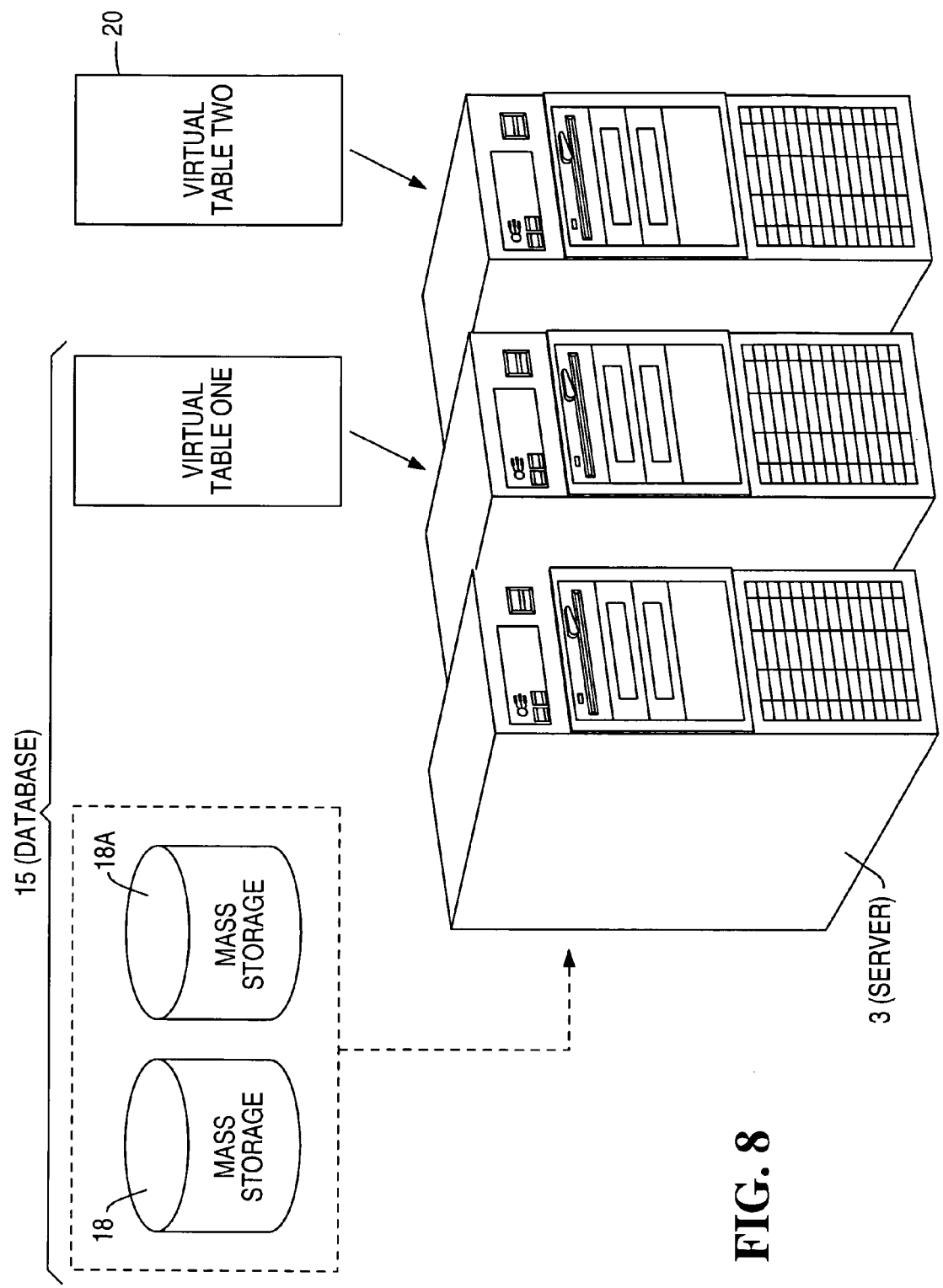
FIG. 8 illustrates one form of the invention.

Therefore, as shown in FIG. 8, the underlying database 15 is stored in both mass storage 18 and part of it also exists as VIRTUAL TABLE 1. The database containing the instrumentation parameters is stored as VIRTUAL TABLE 2, labeled 20.

In another embodiment, the instrumentation parameters are treated as data within the database. They are stored in permanent storage, and are also stored as virtual tables.

In yet another embodiment, a historical record of the instrumentation parameters is generated and maintained. That is, the instrumentation parameters are generated periodically, at convenient intervals. The records of the parameters include a "period" field, which, in effect, is a timestamp of the time the parameters were generated.

The parameters are not destroyed when a subsequent group of parameters is generated, but are saved. Thus, a collection of instrumentation parameters for each of periods 1, 2, 3, and so on, is maintained in permanent storage. A system administrator can gain access to the parameters for a given period, by running a query on the records, and specifying the period number desired, for the period field.

As a specific example, snapshots of the virtual tables are taken periodically. A snapshot reports a subset of the contents, or possibly the entire contents, of the virtual table, and is generated by an SQL (Search Query Language) query. The snapshots are recorded in mass storage, in permanent tables. They form their own searchable database.

Flow Chart

Figure 9:
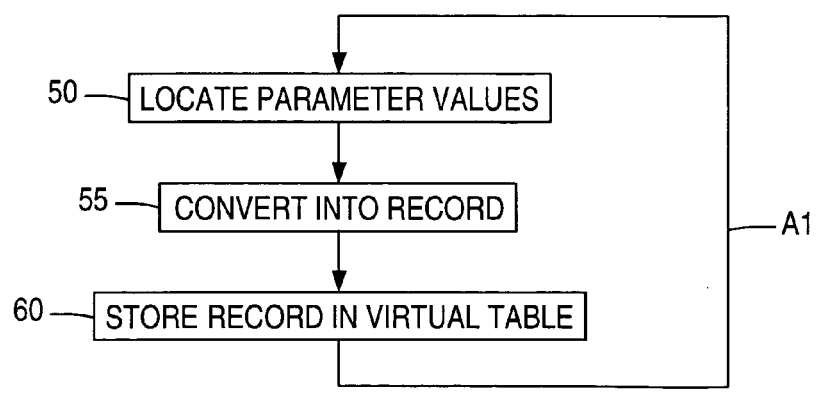
FIG. 9 is a flow chart illustrating logic implemented by one form of the invention.

FIG. 9 is a flow chart illustrating steps undertaken by the invention. In block 50, the instrumentation parameters are located. FIGS. 6 and 7 illustrate examples of the location where one particular parameter would be found. In FIG. 7, "location" is actually virtual: as explained above, the value of the parameter is found through the variable name given to the parameter, not by directly addressing a memory location.

In block 55 in FIG. 9, the parameters are copied into a record format. FIG. 2 illustrates the concept of records. Under the invention, an exemplary record may be divided into the following fields: (1) server identification number, (2) pincount, (3) buffer data, (4) instance data, and so on. In one embodiment, the information in a record is common to a single server, and each server is assigned its own record.

In other embodiments, the commonality may be different. For example, all fields in a given record may relate to a specific database, or a specific part of a database. As another example, all fields in a given record may relate to a database installation in a given city.

In block 60, the record is stored in a virtual table. The table is arranged in a standard database structure, and is searchable through queries. As stated above, the schema of the table is the same as that of the underlying database. The process repeats periodically, as indicated by arrow A1.

Figure 10:
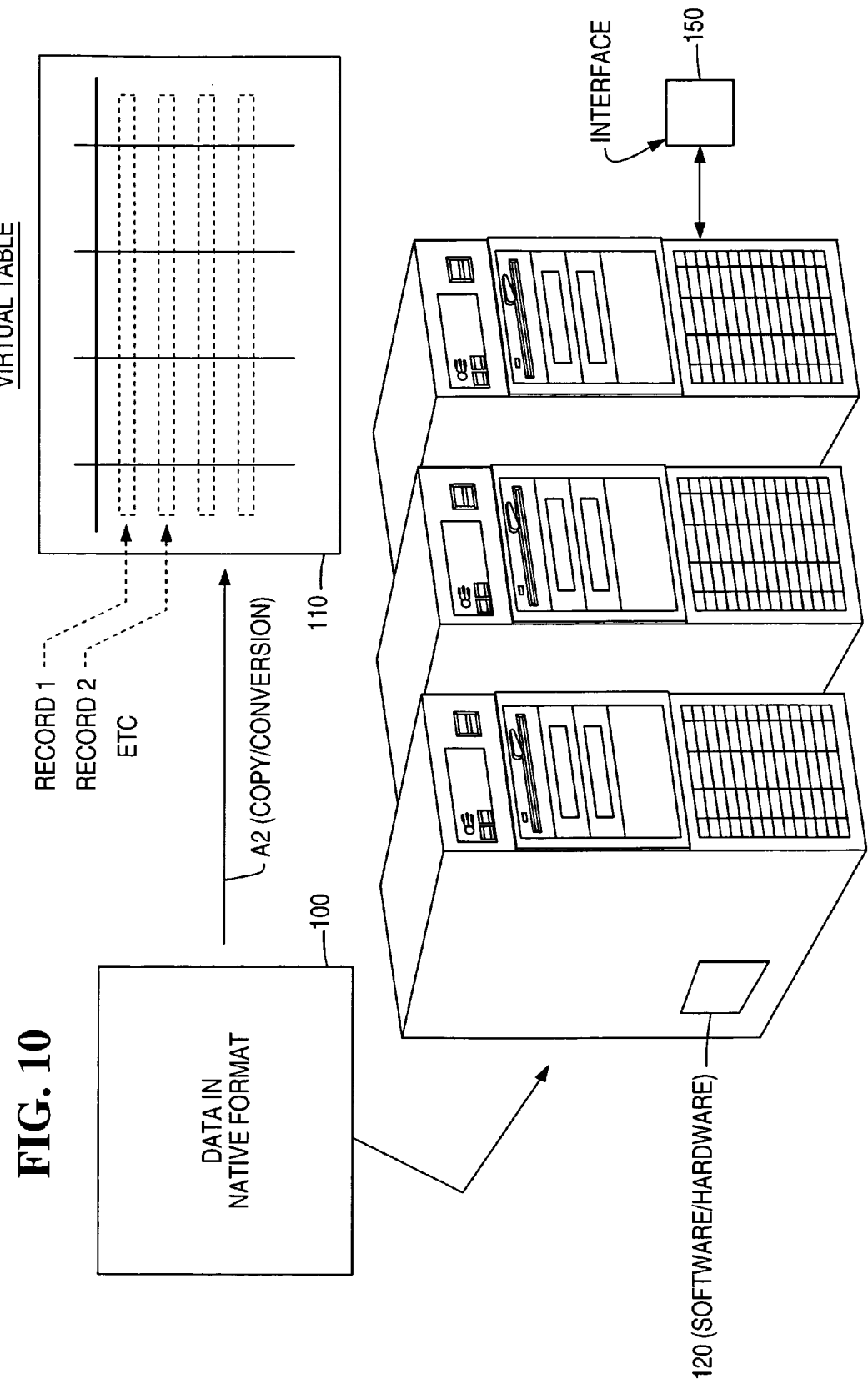
FIG. 10 illustrates operation of one form of the invention.

FIG. 10 illustrates a high-level view of the operation of the invention. Block 100 indicates instrumentation parameters which are stored in their native format, such as those indicated in FIGS. 6 and 7, or other native format. Arrow A2 indicates a copying-and-conversion process, wherein the native data is grouped into records, and stored in virtual table 110. In one embodiment, table 110 co-exists with the data in its native form.

Block 120 indicates the software and hardware which implement the invention, as by performing the processes indicated by arrow A2 and by executing the instrumentation code.

Additional Considerations

1. The parameters, as stored in native format, as in FIGS. 6 and 7, are not searchable by a query language. In contrast, the parameters within the virtual table 110 in FIG. 10 are searchable in this manner.

2. Users interact with the database system through interfaces taking the form of computers or terminals indicated as block 150 in FIG. 10. Such interfaces allow the users to (1) run queries on the underlying database and (2) run queries on the virtual table 110 containing the instrumentation parameters. The interfaces 150 may contain remote links, wherein a remote person dials into the database system, using a telephone line.

3. Background material and terminology regarding databases is available in the text *Database System Concepts*, by Korth and Silberschatz, ISBN 0-07-044754-3 (McGraw-Hill, 1991). This text is hereby incorporated by reference.

4. One approach to storing data within a database will be described. In that approach, each field within the telephone-directory-database described above is allocated a given number of characters. Assume, for simplicity, that number to be twenty.

Of course, all characters within a field are not necessarily used. For example, if a particular name is "Jackson," then the name field will contain the characters "------------- Jackson", that is, thirteen blanks and seven characters.

If ten fields are allocated to each record, then each record will contain 200 characters. The overall database is a concatenation of the records, one record for each telephone subscriber, and each record containing ten fields of twenty characters each. The records may be separated by demarcation characters. To repeat, the database is a sequence of the 20-character segments, or fields, stored in permanent storage, such as a hard drive.

In contrast, program variables are not stored in this manner. They are not arranged in such a concatenation. Nor are they, in general, stored in permanent storage.

Numerous substitutions and modifications can be undertaken without departing from the true spirit and scope of the invention. What is desired to be secured by Letters Patent is the invention as defined in the following claims.

What is claimed is:

1. Apparatus, comprising:
    a) a computer system which stores a main database, the main database being organized according to a schema;
    b) database management software which
        i) runs queries on the main database, and
        ii) contains instrumentation code which
            A) performs examinations of the computer system, the main database, or both, and
            B) generates status data, based on the examinations;
    c) a status database which
        i) stores the status data, and
        ii) is organized according to said schema,
    wherein the database management software is able to run queries against both the main database and the status database;
    wherein said status data includes information identifying pinned records; and
    wherein a pinned record contains a pointer to another record, and the system does not delete a pinned record without saving the pointer.

2. Apparatus according to claim 1, wherein
    d) the computer system includes multiple computers, each running a type of software; and
    e) the instrumentation code derives status data for one, or more, types of the software, which status data includes one or more of the following items of information:
        i) instance number of the software,
        ii) version number of the software,
        iii) date of issue of the software, and
        iv) serial number of the software.

3. Apparatus according to claim 1, wherein the status data includes one or more of the following types of information:
    d) number of pinned records in the main database; and
    e) a list of pinned records.

4. Apparatus according to claim 1, wherein the status data includes information indicating whether data contained in buffers in the system are consistent with copies of the data located outside buffers.

5. Apparatus according to claim 1, wherein
    d) the main database is stored in permanent storage, and copies of some, or all, of the main database is loaded into volatile memory during use;
    c) the status data is not stored in permanent storage, but only in volatile memory.

6. Apparatus according to claim 1, wherein
    d) the instrumentation code performs examinations at different times, thereby generating a set of status data for each time; and
    e) each set of status data is assigned a time stamp, and stored in permanent storage.

7. Apparatus according to claim 6, wherein each time stamp occupies a period field, thereby allowing the database management system to retrieve a set of status data, based on a time stamp.

8. Method, comprising:
    a) maintaining a computer system and a main database stored therein, the main database being organized according to a schema;
    b) maintaining database management software
        i) which runs queries on the main database, and
        ii) which contains instrumentation code which
            A) performs examinations of the computer system, the main database, or both, and
            B) based on the examinations, generates status data;
    c) maintaining a status database which
        i) stores the status data, and
        ii) is organized according to said schema,
    wherein the database management software is able to run queries against both the main database and the status databases
    wherein said status data includes information identifying pinned records; and
    wherein a pinned record contains a pointer to another record, and the system does not delete a pinned record without saving the pointer.

9. Method according to claim 8, wherein
    d) the computer system includes multiple computers, each running a type of software; and
    e) the instrumentation code derives status data for one, or more, types of the software, which status data includes one or more of the following information:
        i) instance number of the software,
        ii) version number of the software,
        iii) date of issue of the software, and
        iv) serial number of the software.

10. Method according to claim 8, wherein the status data includes one or more of the following types of information:
    d) number of pinned records in the main database;
    e) a list of pinned records.

11. Method according to claim 8, wherein the status data includes information indicating whether data contained in buffers in the system are consistent with copies of the data located outside buffers.

12. Method according to claim 8, wherein
    d) the main database is stored in permanent storage, and copies of some, or all, of the main database is loaded into volatile memory during use;
    c) the status data is not stored in permanent storage, but only in volatile memory.

13. Method according to claim 8, wherein
    d) the instrumentation code performs examinations at different times, thereby generating a set of status data for each time; and
    e) each set of status data is assigned a time stamp, and stored in permanent storage.

* * * * *